3 Sheets—Sheet 1.

R. BRYSON.

Harvester.

No. 2,755.

Reissued Aug. 27, 1867.

Witnesses
R. J. Campbell
Edw. Schoffel

Inventor
R. Bryson
by
Mason, Fenwick & Lawrence

N. PETERS, Photo-Lithographer, Washington, D. C.

3 Sheets—Sheet 2.
R. BRYSON.
Harvester.
No. 2,755.
Reissued Aug. 27, 1867.
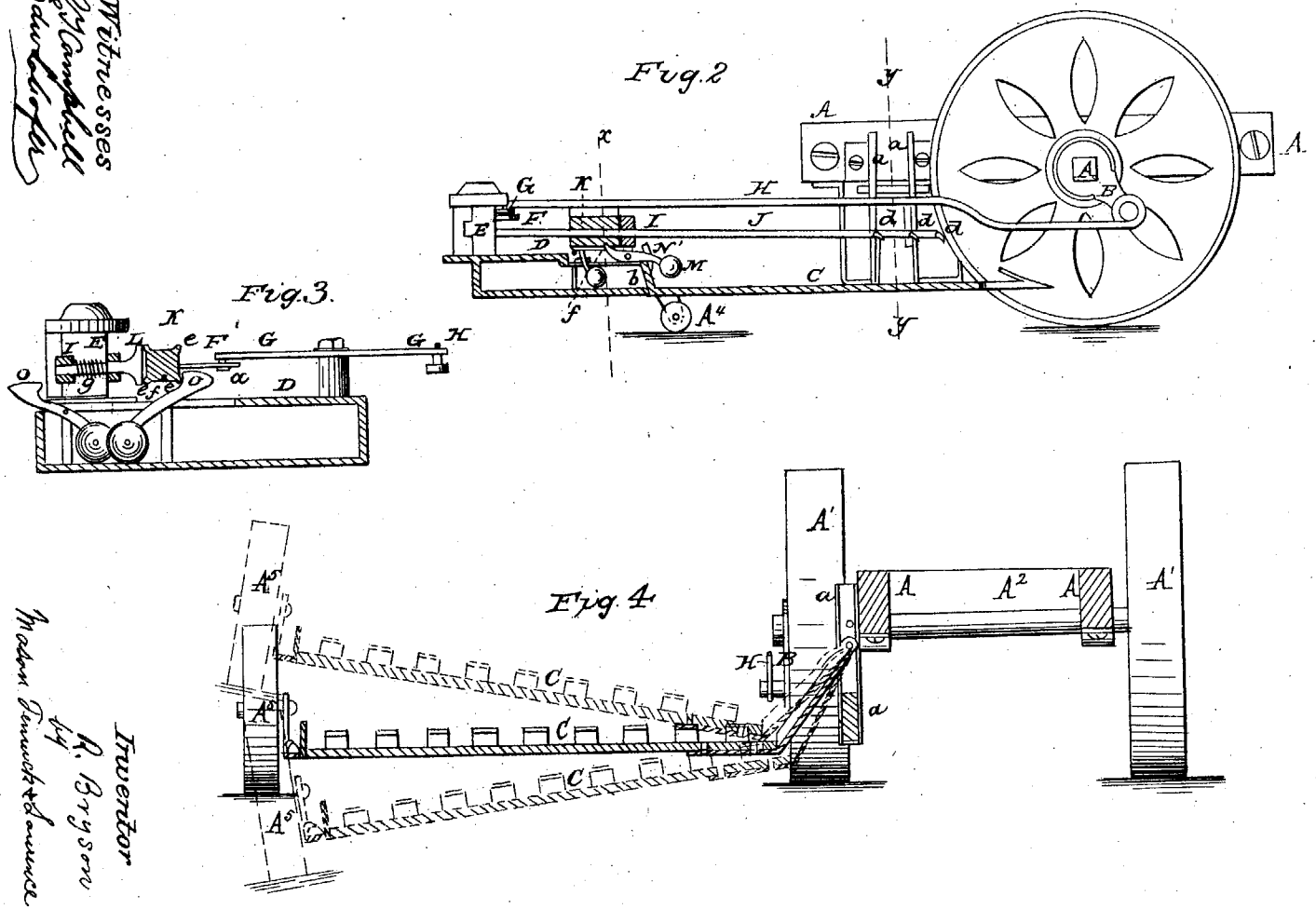
Witnesses
R. G. Campbell
Edw. Lofer
Inventor
R. Bryson
by
Mason Fenwick & Lawrence
N. PETERS, Photo-Lithographer, Washington, D. C.

3 Sheets—Sheet 3.

R. BRYSON.

Harvester.

No. 2,755. Reissued Aug. 27, 1867.

Witnesses
R S Campbell
Edw Schafer

Inventor
R. Bryson
by
Mason Fenwick & Lawrence

N. PETERS. Photo-Lithographer, Washington, D. C.

UNITED STATES PATENT OFFICE.

ROBERT BRYSON, OF SCHENECTADY, NEW YORK.

IMPROVEMENT IN HARVESTERS.

Specification forming part of Letters Patent No. 34,875, dated April 8, 1862; Reissue No. 2,755, dated August 27, 1867.

*To all whom it may concern:*

Be it known that I, ROBERT BRYSON, of Schenectady, in the county of Schenectady and State of New York, have invented certain novel Improvements in Harvesting-Machines; and I do hereby declare that the following is a full, clear, and exact description of that part of said invention which relates to Division No. 1, reference being had to the accompanying drawings, making a part of this specification, in which—

Figure 1:
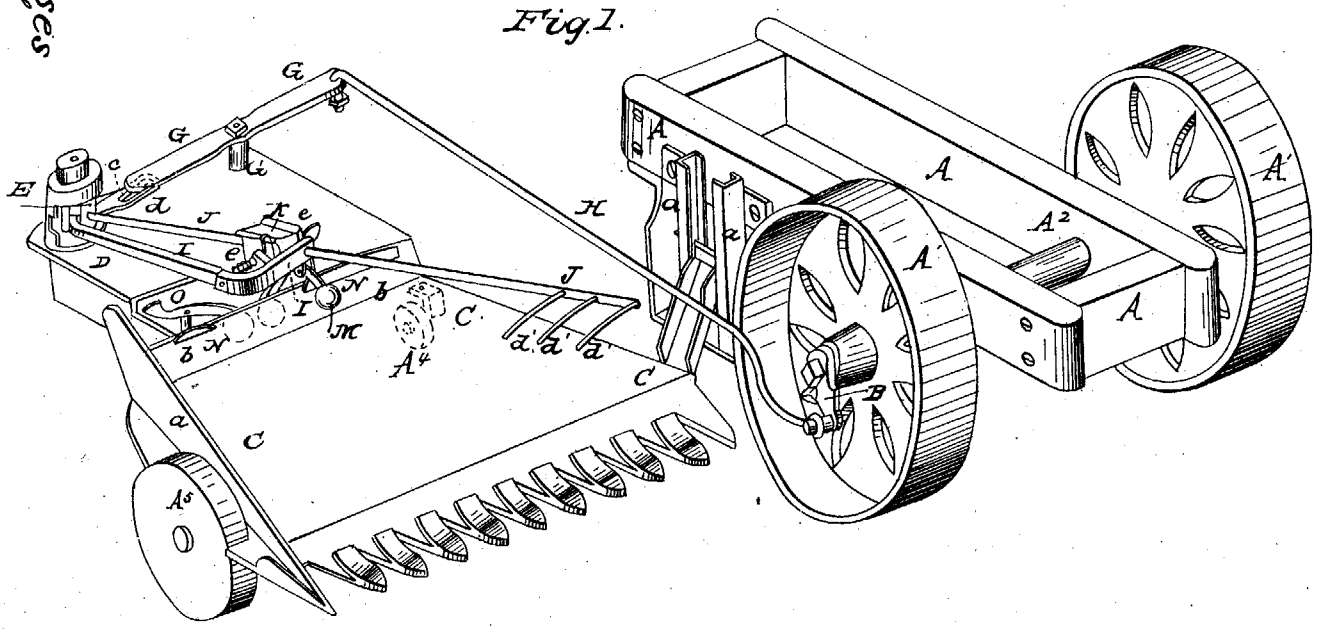
Figure 5:
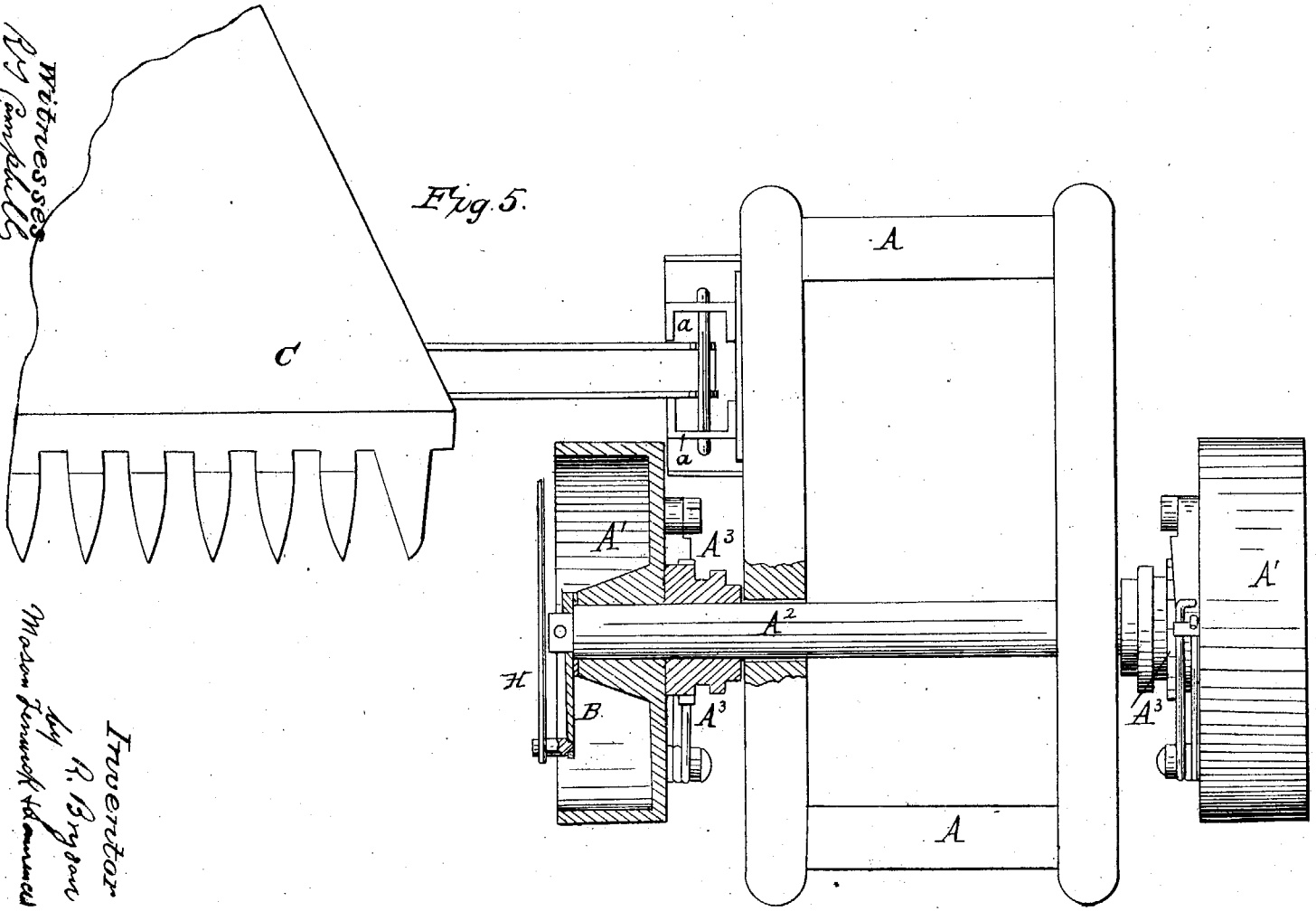

Figure 1, Sheet 1, is a perspective view of the improved machine. Fig. 2 is a longitudinal section taken in a vertical plane through the platform and raking devices, looking toward the draft-frame. Fig. 3 is a transverse section taken in the vertical plane indicated by line *x x* in Fig. 2, looking toward the rear of the platform. Fig. 4 is a transverse section taken in the vertical plane indicated by line *y y* in Fig. 2, showing the finger-beam in three different positions as it would vibrate about its axis of motion. Fig. 5 is a sectional top view of the main frame of the machine, showing the mode of attaching the driving-wheels to the main axle.

Similar letters of reference indicate corresponding parts in the several figures.

The main object of this invention is to combine in a harvesting-machine the following instrumentalities, to wit, a main frame which is adapted for carrying the driver's seat and the gearing that operates the cutters, and also for having the draft-tongue attached to it, said frame being carried by two driving and supporting wheels, and having the platform and finger-bar attached to it, with a rake which will move over the platform at intervals, and discharge the cut crop at one side thereof, in rear of the driving-wheels and out of the path of the team in cutting the succeeding swath, as will be hereinafter described.

Another object of my invention is to fasten the pivot or fulcrum of a rake and its guide to a finger-beam or platform hinged to the frame of the machine in such manner that the rake is wholly sustained upon the platform, and will accommodate itself to all the movements thereof, as will be hereinafter described.

Another object of my invention is to arrange the crank which communicates motion to a rake which is on a platform, in such relation to the joint of the finger-bar that the movements of this finger-bar will not cause the joints to bind, nor materially affect the action of the crank which works the rake, as will be hereinafter described.

Another object of my invention is to combine, with a two-wheel draft-frame, a hinged platform, having a rake mounted upon it, and to so apply the transporting-wheels to their axle that motion will be communicated from this axle to the rake when the machine is moved forward or turned around in either direction; but when the machine is moved backward the rake will cease to operate, as will be hereinafter described.

To enable others skilled in the art to understand my invention, I will describe its construction and operation.

In the accompanying drawings, A represents the main or draft frame, which is adapted for having applied to it a driver's seat and a draft-tongue. This frame A is mounted upon two transporting-wheels, $A^1$ $A^1$, which are also driving-wheels for operating a rake and a cutting apparatus. These wheels $A^1$ are applied loosely upon a transverse axle, $A^2$, and connected thereto by means of pawls and ratchets $A^3$ $A^3$, as shown in Fig. 5, Sheet 2, so that when the machine is moved forward said axle will turn with the wheels, and when the machine is moved backward the wheels will turn freely around the axle.

By having a ratchet and pawl applied to each wheel, as described and shown, the axle will be turned by one or the other of the wheels when the machine is turned around.

On that end of the axle $A^2$ which projects from the grain side of the frame A a crank or eccentric, B, is keyed, for the purpose of communicating motion to the rake mechanism, as will be hereinafter described.

C represents the platform upon which the grain falls as it is cut, which platform is hung in rear of the driving-wheels $A^1$, and attached by means of a suitable joint to the grain side of the main frame.

The mode of attachment shown in the drawings consists of two upright guides, *a a*, which are secured firmly to frame A, parallel to each other, within which guides are sliding or rolling boxes, and to these boxes the inner end of the finger-beam, or a bracket projecting from the platform C, is suitably hinged, as clearly shown in Fig. 4. This mode of attaching the finger-beam and platform to the main frame affords a free joint, which will allow the outer end of said finger-beam and platform to vibrate above and below a horizontal position, and thus conform to the undulations of the ground, as indicated in Fig. 4. Said attachment will also allow the finger-beam and platform to rise and descend bodily. The outer part of the finger-beam, together with the platform which is secured to it, is sustained by a small wheel, $A^5$, (shown in Figs. 1 and 4,) and in rear of the cutting apparatus, on that side of the platform which is nearest the main frame A, another wheel, $A^4$, is applied, for sustaining the rear part of the platform, as shown in Figs. 1, 2, and 4.

The platform C is broader at its front edge than it is at its rear end, and it is guarded on its outer or grain side by an inclined dividing and directing board, $a^1$, and at its rear end by a slightly-twisted board, *b*, which rises from the surface of the platform a proper distance. To this rear board *b* an extension or auxiliary platform, D, is attached, and closed in at all sides, and at top to a considerable extent.

The form of the platform C and its extension D may be different from that shown without departing from the invention which I claim.

It will be seen that while the rake is attached to the platform proper its weight, with that of the platform, comes in a great degree upon the finger-beam and the hinge-connection between the draft-frame and the finger-beam. Therefore the rake, although placed upon the platform, is, in fact, sustained by the hinge-connection between the finger-beam and the draft-frame. This being so, it follows that the rake, platform, and finger-beam will rise and fall together on this hinge-connection whenever the finger-beam or platform passes over undulating surfaces. This being the effect produced, my invention would not be departed from if the rake was placed on any other part of the structure formed by a union of the platform and finger-beam than that shown. Such change of position might constitute a patentable and valuable improvement subordinate to my invention.

It will be seen from an inspection of the drawings that my platform is wholly on the inner side of the draft-frame, and therefore a short finger-beam does not extend beyond said inner side of the draft-frame, or, in other words, does not extend behind the draft-frame and to the outer rear corner thereof, in such a manner as to act as an obstruction and become clogged with grass and other substances during the operation of the machine.

It will further be seen that the hinge-connection of the finger-beam is such that the cutting apparatus may be lowered for mowing and elevated for reaping, at the will of the operator, by means of the lever arrangement shown in my former patents. This hinge-connection also, as before stated, fulfills the functions of the double hinge-joint commonly used on harvesters.

E represents a rock-shaft, which is perpendicular, or nearly so, to the platform D, upon which said shaft is arranged, as shown in the drawings. From one side of this shaft extends a horizontal slotted arm, F, in the slot *c*, of which the vertical pin *d* of a horizontal vibrating lever, G, plays freely. The lever G is pivoted to a post, G′, located near the rear inner end of platform D, and connected to the crank B of the axle $A^2$ by a pitman-rod, H.

From an opposite side of the rock-shaft E a right-angle bar or rake-guide, I, projects, and extends to the rear guard-board *b*, and from the front side of said shaft E a rake-head, J, extends, and passes through the front bent arm of the bar I. This rake-head J terminates just at the back of the cutting apparatus, and has rake-teeth *d′* firmly secured to it near said termination, the rake-teeth standing at right angles to their head, and being slightly curved, so as to hug the grain during the raking strokes. The rake-head, being thus arranged so as to turn in the path of a vertical circle a quarter of a revolution, will also vibrate in a plane parallel, or nearly so, to the platform C. In order to allow the rake-teeth to move closely up to the guard *a′* and then turn down into raking position, slots may be cut through this guard.

K represents a four-sided block, which is secured fast on the rake-head J, and which is located in rear of the front angle of the guide I, and has rounded projecting corners *e e e e* and recesses *f f′* formed on and in it. The cavities or recesses are in the center of the width of the block, and near one end, and run at right angles to each other, as shown.

L is a hammer-shaped spring-stop for bearing equally against one or the other of two sides of the block, according as the block changes its position. This stop L fits in guides of the bar I, and is arranged to slide back and forth across, or from one side toward the other of the platform D. This stop fits in guides, as stated, so as to spring back and allow the block K with its rake-bar to be oscillated at proper times. The spring, which acts upon the stop to hold it against the block, will prevent the rake from being turned too far around.

M is a loaded lever, or a spring-lever, which is hung to the under side of the angular guide-bar I, so as to cross the rear guard-board *b*. N N′ are opposing inclined lugs attached to the top edge of the board *b*. These inclined lugs are set some distance apart, and are designed to elevate the loaded arm of the lever M, and thus lower the hook or bent end *h* thereof. The hooked end of the lever M takes into the cavity *f* when the rake is sweeping the grain off of the platform, and into the cavity $f'$ when it is moving back with its teeth horizontal and clear of the platform, the inclined lug N throwing it out of the cavity $f$ and the inclined lug N′ out of the cavity $f'$, and its loaded arm insuring its re-entrance into said cavities at the proper time, or when the inclined planes cease to act upon the loaded end of the lever.

O O are two loaded tripping hook-levers. They are pivoted to the sides of vertical standards of the auxiliary platform D. These levers vibrate vertically, and the hooks on their upper ends are set so as to operate in opposition to one another. Between the hooks of the levers O O the square block K K of the rake-head moves, and in its movements back and forth the corners *e e* of the block strike one or the other of the hooks, accordingly as the rake-head is moving, and, by reason of this contact and the weights on the ends of the levers O O, the square block K is turned the distance of a quarter of a circle in its movement toward the open or discharge side of the platform, and a like distance in its return movement. Before these movements of the block K can be effected the lever-hook stop M is forced, by the inclined lugs N N′, out of the cavities $f f'$. The extent and rapidity of the movements of the block are controlled by means of the spring-stop L, said stop also serving to maintain the block in its proper position by bearing on the corners thereof, which corners, by being rounded and projecting, as shown, reduce the frictional contact while the changes in the position of the block K and rake are being effected.

From the foregoing description it will be seen that the crank B, in its revolution, vibrates the lever G through the rod H; that the lever G, in its vibrations, rocks the shaft E through the slotted arm F; and that the rake is, through shaft E, caused to traverse the platform C in the path of a horizontal plane, both back and forth, the rake in its forward movement sweeping the grain from the platform to a position in rear of the draft-frame; and, finally, that the rake, at the completion of its forward stroke, is tripped and thrown up clear of the platform by the combined aid of the inclined planes and the lever-hooks O O, and maintained in this position by the hammer-shaped lever and the lever-hook M while it is making its back movement, and at the completion of said movement is again tripped and its teeth thrown down to a raking position for sweeping off another gavel from the platform, and maintained in this position by the hammer-shaped lever and the hooked lever M.

The rake-arm J receives an intermittent oscillating movement about its own axis, for bringing the teeth into raking position and then turning them up out of such position. At the same time the rake-arm receives a vibrating motion in a plane parallel to the platform by the oscillation of the upright shaft E, which is located near the rear end of the platform D, as before explained.

Having described my invention, what I claim as new, and desire to secure by Letters Patent, is—

1. A main frame of a harvester, which is adapted for carrying the driver's seat and the gearing that operates the cutters, and also for having the draft-tongue attached to it, said frame being carried by two driving and supporting wheels, both of which are furnished with a ratchet and pawl, and having a finger-bar carrying a platform hinged to it at one side thereof, in combination with a circularly-moving sweep-rake, which is sustained by the hinged connection of the finger-bar and platform, and moves over the platform at intervals, and discharges the cut crop at one side thereof in rear of the driving-wheels, such rake being driven automatically from the draft-frame.

2. A fulcrum or pivot for a circularly-moving sweep-rake, a guide for such rake, and a finger-beam carrying a platform, all so connected to each other and hinged to the draft-frame at one side thereof that while the rake has no other support upon the draft-frame than is derived from the hinge-connection of the finger-beam, and is driven automatically from the draft-frame, it, with its pivot and guide, will work in unison with the platform and finger-beam through all the vibrations of the same without affecting the draft-frame or changing the angle of the pivot or fulcrum with the platform.

3. Arranging the crank or its equivalent, which communicates motion to a rake which is on a hinged platform nearly in line with the joint of the finger-bar, so that the movements of this finger-bar will not cause the joint to bind, nor materially affect the motion of the crank which works the rake.

4. In a harvester with a two-wheel draft-frame, a finger-bar carrying a platform and a rake, the finger-bar, platform, and rake being connected to each other, and hinged to the draft-frame at one side thereof, communicating motion to said rake from the main axle when the latter is connected to both driving-wheels by pawls and ratchets.

5. The combination of a finger-beam carrying a platform and a circularly-moving sweep-rake, an inner and outer supporting-wheel for the finger-beam, platform, and rake, a hinge-connection, which is parallel, or nearly so, to the line of draft for the finger-beam and platform, and a two-wheel draft-frame.

6. A sweep-rake mounted upon a platform connected to a finger-beam, which is hinged to the inner side of the draft-frame in such manner that the inner edge of the platform does not extend beyond the said inner side of the draft-frame.

7. A sweep-rake, a platform, and a finger-beam, connected together and hinged to the draft-frame by means of a hinge-connection, which allows both the outer and inner end of the finger-beam and platform to accommodate themselves to the undulations of the ground, so that the rake is allowed unchangingly to follow the motions of the platform and cutting apparatus or finger-beam.

8. A sweep-rake mounted on a hinged platform and driven from the main frame, the pivot of said rake being between the center of the draft-frame and the outer divider of the platform, and the platform upon which the grain falls terminating near the inner side of the draft-frame.

ROBT. BRYSON.

Witnesses:
JNO. DE LANCEY WATKINS,
JAMES HANLEY.